United States Patent [19]

Shank

[11] Patent Number: 4,500,453

[45] Date of Patent: Feb. 19, 1985

[54] CROSS-LINKED PROTEIN COMPOSITION USING ALUMINUM SALTS OF ACETIC ACID

[75] Inventor: Joseph L. Shank, Matteson, Ill.

[73] Assignee: DynaGel Incorporated, Calumet City, Ill.

[21] Appl. No.: 626,533

[22] Filed: Jun. 29, 1984

[51] Int. Cl.[3] .......... C09H 7/00; G03C 1/30

[52] U.S. Cl. .......... 260/117; 106/125; 260/123.7; 430/621; 435/69

[58] Field of Search .......... 260/117, 123.7; 106/125; 430/621; 435/69

[56] References Cited

U.S. PATENT DOCUMENTS

| | | | |
|---|---|---|---|
| 117,520 | 8/1871 | Devine | 106/125 |
| 611,814 | 10/1898 | Millar | 260/117 |
| 1,927,166 | 9/1933 | Frieden | 106/125 |
| 2,196,146 | 4/1940 | Collins | 260/117 X |
| 2,296,108 | 9/1942 | Kinney | 260/119 |
| 3,497,358 | 2/1970 | Sieg et al. | 260/117 X |
| 3,811,832 | 5/1974 | Briggs | 260/123.7 UX |
| 3,832,197 | 8/1974 | Overman | 260/117 X |
| 4,090,013 | 5/1978 | Ganslaw et al. | 260/117 X |

*Primary Examiner*—Howard E. Schain

*Attorney, Agent, or Firm*—Dressler, Goldsmith, Shore, Sutker & Milnamow, Ltd.

[57] ABSTRACT

This invention relates to cross-linked collagen-derived protein compositions having improved Bloom gel strength and increased viscosity. More particularly, it relates to improvement by cross-linking the protein with an aluminum salt of acetic acid selected from the group consisting of aluminum subacetate, aluminum triacetate and an alkali metal aluminum acetate double salt.

19 Claims, No Drawings

CROSS-LINKED PROTEIN COMPOSITION USING ALUMINUM SALTS OF ACETIC ACID

TECHNICAL FIELD

This invention relates to cross-linked collagen-derived protein compositions having improved Bloom gel strength and increased viscosity, and particularly to gelatin derived from collagen that is cross-linked with an aluminum salt of acetic acid.

BACKGROUND ART

Proteins are highly complex polymers comprised of amino acid chains connected by peptide linkages and occur in the cells of all living organisms. Protein comprises the basic component of connective tissue in the form of collagen, and is also the basic component of hair, nails, feathers and skin in the form of keratin. Protein is a term that generally describes complex nitrogenous substances, commonly known as gelatin, fibrin and casein.

Animal gelatin is a commercially important proteinaceous material obtained by the partial hydrolysis of collagen, which is the chief protein component in skins, bones, hides, and white connective tissues of the animal body. Animal glue and proteolytic enzyme-hydrolyzed gelatin are lower molecular weight protein products obtained by a more complete hydrolysis of collagen, and thus can be considered as containing lower molecular weight fractions of gelatin.

Animal glue and animal gelatin are almost identical. They are produced by the same methods and from the same raw materials but differ in purity and quality. In some instances, however, animal glue is referred to as technical gelatin. Gelatin is used in the food, pharmaceutical and photographic industries that take advantage of its gelatin properties which include: a reversible gel-to-sol transition in aqueous solution; a capability to act as a protective colloid; water permeability; insolubility in cold water but complete solubility in hot water resulting in viscous warm aqueous solutions.

For commercial applications, a water-soluble gelatin is generally desired. Aqueous solutions of gelatins are used in candies, dairy products, meat products, and primarily in gelatin desserts. In some uses, a gelatin composition is in the form of a relatively large gelled block, as in a dessert; while for other uses, it is in the form of an extremely thin, gelled film, as in a photographic subing, and in the form of a liquid glue in an adhesive.

The viscosity of aqueous gelatin solutions generally increases with increasing gelatin concentration and decreasing temperature. In some applications, such as photographic film products, the gelatin matrix is cross-linked by chemical means to provide a hardening that permanently changes the solubility of the gelatin.

In most edible gelatin products, a Type A gelatin is used. Type A gelatin is produced by an acid hydrolysis curing process of collagenous raw materials using techniques that are well-known in the art. Type A gelatin has an isoelectric point between a pH value of about 7 and 9. Some Type B gelatin is also used in edible gelatin products. Type B gelatin is produced by an alkali hydrolysis curing process, usually a liming process, that is well-known in the art. Type B gelatin has an isoelectric point between a pH value of about 4.6 and about 5.2.

A cross-linked gelatin is desirable for pharmaceutical enteric capsules. The gelatin used for soft capsules is generally either a Type A gelatin having a low-Bloom value of about 170 to about 180 grams, a Type B having a low-Bloom value of about 150 to about 175 grams, or a mixture of Types A and B. Hard capsules are generally made of a Type A gelatin having a medium-to-high Bloom value of about 250 to about 280 grams, a Type B having a medium-to-high Bloom value of about 225 to about 250 grams or combinations thereof.

Bloom value or Bloom gel strength is well-known in the art as a property of gelatin which relates to the gel strength or firmness which a particular gelatin composition produces under standardized conditions. The Bloom gel strength or Bloom value is based upon the force in grams required to cause a standardized piston to move through 4 millimeters (mm) of a standardized gelled sample, and is measured at a temperature of 10 degrees C. (about 50 degrees F.) with a commercially available machine commonly known as a Bloom Gelometer. A higher Bloom value indicates a higher gel strength and a higher gelling temperature than that of a lower Bloom value for a selected amount of gelatin.

Gelatins and glues are generally graded on the basis of Bloom gel strength, determined as hereinbefore described, and by the viscosity of an aqueous solution. Viscosity is usually measured as a flow time in millipoises at about 60 degrees C. (about 140 degrees F.) through a standard pipette or in a U-tube viscometer using procedures that are well-known in the art. Thus, the Bloom gel strength and viscosity of both these proteins plays an important part in their commercial utility.

There is a need for a cross-linked gelatin composition having improved Bloom gel strength and increased viscosity, where the gelatin composition has been cross-linked with a material that is generally recognized as safe (GRAS) by the United States Food and Drug Administration for use in edible products and pharmaceuticals. Persons skilled in the art will appreciate that a desirable cross-linked gelatin composition for use in edible products and pharmaceuticals should be clear and substantially color-free. It is to be understood that the term "substantially color-free" as used herein with reference to a cross-linked gelatin composition means a composition that retains the straw color inherent in food grade gelatin. There is also a need in industrial applications for a clear substantially color-free gelatin that retains its Bloom gel strength and its viscosity over a relatively wide range of useful pH values.

BRIEF SUMMARY OF THE INVENTION

One embodiment of this invention relates to a cross-linked gelatin composition having improved Bloom gel strength and an increased viscosity in aqueous solutions over that of the uncrosslinked native gelatin. More particularly, the cross-linked gelatin composition is the reaction product of a water-soluble gelatin and an aluminum salt of acetic acid selected from the group consisting of aluminum subacetate, aluminum triacetate and alkali metal aluminum acetate double salts. Gelatins having a low Bloom value of from about 80 to about 160 grams are particularly improved by the method of cross-linking described herein.

Another embodiment of this invention relates to a method for treating a water-soluble gelatin comprising the steps of reacting the water-soluble gelatin in water with an aluminum salt of acetic acid selected from the group hereinbefore listed. This treatment produces an unexpectedly high increase in Bloom value and in viscosity of aqueous solutions of the gelatin with substantially no effect on its color or clarity over a relatively wide range of useful pH values.

A particular improvement to the cross-linked gelatin composition centers primarily around the use of aluminum subacetate solution freshly prepared as a water-clear aqueous filtrate from GRAS materials under sanitary conditions to provide a product that is suitable for use in edible materials. Commercially available aluminum acetate homologs are not suitable in the same manner as hereinafter disclosed.

Gelatins are known to be cross-linked by metal polyvalent ions, such as chromium, iron and aluminum. The aluminum ion is particularly desirable for cross-linking protein for use in food products because its presence in foods and in medications is well-known and its reaction products are substantially color-free. Chromium and iron ions are generally not suitable for edible products and impart an undesirable color to the gelatin.

Alum salts, which are known in the trade as aluminum ammonium sulfate, aluminum potassium sulfate and aluminum sulfate are used in the manufacture of pickled cucumbers and edible collagen sausage casings. Aluminum sulfate is available as a GRAS material and is used as a miscellaneous and/or general purpose food additive. Thus, the use or presence of aluminum ion in foods and medications is found in such products as antacids, buffered aspirins, hemmorhoidal medications, baking powder, sliced processed cheese, pancake mixes, frozen dough and self-rising flour.

However, gelatins that have been cross-linked with aluminum salts of strong acids, such as aluminum sulfate or aluminum chloride, do not retain their clarity, or improved Bloom gel strength or viscosity over a wide range in pH values. Aluminum salts of other organic acids, such as aluminum citrate, aluminum lactate, aluminum caprylate and aluminum tartrate, are usually difficult to prepare and are either insoluble in water or unreactive with gelatin.

Homologs of aluminum subacetate, such as basic aluminum acetate, aluminum diacetate, and aluminum hydroxy acetate, are not suitable for the purpose of this invention. These homologs do not produce water-clear solutions, are generally insoluble or are only slightly soluble in water and usually require the use of acidic conditions and/or prolonged holding at an elevated temperature to achieve a marginal level of cross-linking at best.

On the other hand, aluminum triacetate, which is soluble in water, was also found to be useful for the purpose of the invention. It was also surprisingly found that an alkali metal aluminum acetate double salt was suitable for use in the invention as disclosed herein, whereas the alkali metal aluminum double salt of a strong acid was not so suitable.

Frieden, in U.S. Pat. No. 1,927,166, teaches the use of a soluble trivalent metal salt, such as aluminum sulfate, chromium sulfate or iron chloride, to chemically react with gelatin or glue substances in water to increase the viscosity of the solution and effect a quick hardening or setting of the gelatin. However, Frieden teaches a two-step process wherein the material is first coated with gelatin for purposes of adhesively joining it to another material, and the salt solution is subsequently applied to the gelatin coated surface. The salt solution is adjusted to a pH value of above 3.5 and below 5.2 with an alkali or alkaline salt, such as sodium hydroxide, potassium hydroxide or sodium carbonate, or a neutral salt, such as sodium sulfate or sodium chloride, to form a buffer salt. However, it has been found that the aluminum, chromium, and iron salts taught by Frieden are not suitable for the purpose of the invention as disclosed herein.

Collins, in U.S. Pat. No. 2,196,146 teaches the use of a buffer salt comprised of a strong base and a weak acid to quicken the setting of a gelatin dessert product containing sugar and fruit acid at a pH value of 3 to 4.7 without impairing the taste of the product. The useful salts disclosed therein are salts of organic acids such as tartrates lactates, acetates or citrates or weak inorganic acids, such as borates. However, the thrust of Collins's teachings is to overcome the tendency of dry gelatin food products to cake and to be inactivated by inversion of the sugar in the presence of fruit acid. The buffer salts taught by Collins are monovalent buffers that repress the ionization of the fruit acid. Thus Collins's teachings do not anticipate the use of a polyvalent metal salt for the purpose of cross-linking gelatin. Additionally, the other organic salts taught by Collins are either insoluble or unreactive with gelatin in the manner disclosed herein.

Sieg, et al. U.S. Pat. No. 3,497,358 teaches the use of a monovalent water-soluble salt of an unsubstituted organic acid having no more than 10 carbon atoms in combination with aldehyde hardeners to increase gelatin hardening, primarily for use in photo sensitive photographic emulsions. However, the invention disclosed herein does not require aldehyde hardeners, and such hardeners would be unsuitable for use in edible products. Further, there is nothing in Sieg's teachings to suggest that polyvalent metal salts would be useful in place of or in combination with the aldehyde hardeners.

Devine, in U.S. Pat. No. 117,520, teaches the use of alum to aid in setting or congealing glue solutions used as sizing for window shade manufacture. However, it has been found that alum, which is a double aluminum salt of a strong acid, is not effective in the invention as disclosed herein.

An advantage and benefit of a treated gelatin, cross-linked in the manner disclosed, is that the resulting cross-linked gelatin composition has an improved Bloom gel strength and increased viscosity. The cross-linked gelatin composition substantially retains a clear, colorless characteristic, along with improved Bloom gel strength and increased viscosity over a useful broad pH range.

Another benefit of the method of cross-linking gelatin with aluminum subacetate, prepared fresh from GRAS materials as disclosed herein, is that the resultant cross-linked protein composition is particularly suitable for use in foods, pharmaceuticals and photographic products and industrial applications requiring clear, colorless gelatins and glues that retain these properties within a broad range of pH values. Additionally, the method of improving gelatin compositions can be carried out by reacting the gelatin in a water solution to form a cross-linked gelatin composition that can be gelled and dried in a conventional manner.

An additional advantage of cross-linking gelatin in the manner disclosed permits the upgrading of the gel strength of gelatin having a low Bloom value for use in foods.

Still further benefits and advantages of the present invention will become apparent to those skilled in the art from the detailed description of the invention, the examples and the claims which follow.

DISCLOSURE OF THE INVENTION

A preferred embodiment of this invention is a method for treating a water-soluble collagen-derived protein comprising the step of reacting the protein in water with an aluminum salt of acetic acid selected from the group consisting of aluminum subacetate, aluminum triacetate and an alkali metal aluminum acetate double salts. The reaction product of the treated protein is a cross-linked protein composition of improved Bloom gel strength and increased viscosity in aqueous solutions over that of the native proteins.

The term "collagen-derived protein composition" as used herein means a composition containing a water-soluble protein, derived from a partial hydrolysis of animal collagen, such as a gelatin, or from a more complete hydrolysis, such as a glue or a liquid protein hydrolyzate. The hydrolysis can be generated by an acid, or an alkali or a proteolytic enzyme by methods well-known in the art.

Those skilled in the art will recognize that acid-hydrolyzed collagen is commonly known as Type A gelatin and has an isoelectric point between a pH value of about 7 and about 9. It is to be understood that any reference herein to Type A gelatin refers to gelatin that has been partially hydrolyzed with an acid, such as sulfuric acid, hydrochloric acid or phosphoric acid, by hydrolysis curing methods well-known in the art. Type A gelatins are usually washed with water after acid-hydrolysis curing, are subsequently adjusted to a pH value of from about 3.5 to about 4.5 and then dried to a powder.

Alkali-hydrolyzed gelatin is commonly known as Type B gelatin and has an isoelectric point between a pH value of about 4.6 and about 5.2. It is also to be understood that Type B gelatin, as used herein, refers to gelatin that has been hydrolyzed with an alkali, such as sodium hydroxide or a lime slurry, by methods that are well-known in the art. Type B gelatins are usually subsequently washed with water and then neutralized with hydrochloric acid, sulfuric acid, acetic acid or phosphoric acid to a pH value of about 5.5 to about 7.0.

Protein hydrolyzate, as used herein, refers to collagen gelatin that has been hydrolyzed to lower melecular weight peptides or to a solution of its constituent amino acids with an acid or an alkali, as hereinbefore described, or with a proteolytic enzyme, such as papain, bromelain, pepsin, and trypsin, by methods that are well-known in the art. Protein hydrolyzate solutions are sometimes referred to as "liquid protein".

A particularly preferred method for treating water-soluble protein to improve Bloom gel strength and increase viscosity comprises the steps of:

(a) preparing a clear aluminum subacetate filtrate (ASF) solution having a solids content of from about 0.05 to about 16 weight percent and a pH value in the range of from about 4.0 to about 4.2. The ASF solution is prepared by reacting aluminum sulfate octadecahydrate (alum) with a quantitative amount of calcium carbonate in water to form a hydroxyaluminum carbonate. The resulting hydroxyaluminum carbonate is further treated with a quantitative amount of acetic acid to form aluminum subacetate solution. The solution is aged for a period of from about 20 to about 24 hours. The aged solution is filtered to recover said aluminum subacetate as a clear filtrate solution and sufficient water is added to adjust the solids content;

(b) providing an aqueous protein solution, said solution comprising ten parts by weight water-soluble protein and 90 parts by weight water, said protein selected from the group consisting of an acid-hydrolyzed collagen, an alkali-hydrolyzed collagen and a proteolytic enzyme-hydrolyzed collagen; and (c) reacting the aluminum subacetate with the water-soluble protein by adding the filtrate solution to the protein solution with mixing agitation. The reaction product of the treated protein is a cross-linked protein composition having an improved Bloom value and increased viscosity over that provided by the untreated protein.

Aluminum subacetate is preferably prepared fresh from GRAS food grade material that conform to the standards of the United States Pharmacopoeia (USP). However, commercially available aluminum triacetate and alkali metal aluminum acetate double salt are also suitable for use in this invention. Examples of suitable alkali metal aluminum acetate double salts include sodium aluminum acetate and potassium aluminum acetate, as disclosed in the examples hereinbelow.

The water-soluble protein to be cross-linked is preferably reacted with the aluminum salt utilizing a ratio of from about 0.01 to about 0.20 parts by weight aluminum ion to 10 parts by weight dry basis of protein. It is to be understood that the term "water-soluble protein", as used herein, further includes a gelatin, a glue or a protein hydrolyzate derived from animal collagen as hereinbefore described. It is further to be understood that the terms "improved protein composition" and "improved cross-linked protein composition" are used interchangeably herein and refer to water-soluble protein treated as hereinbefore described.

For purposes of exemplifying the invention, aluminum subacetate is primarily used to cross-link gelatin or glue, but is not so limited. The preparation of fresh aluminum subacetate filtrate solution is described in the Glossary of Materials and Methods hereinbelow. For convenience, aluminum subacetate filtrate will be referred to hereinafter as ASF. Reference to ASF solids, therefore, refers to an ASF level calculated on an anhydrous basis as described in Section B of the Glossary hereinbelow.

Thus, a representative ASF level ranging of from about "minimum" to "maximum", as defined therein, provides a calculated amount of aluminum ion per 10 pounds of gelatin ranging from about 0.01 to 0.16. Persons skilled in the art will appreciate that the highest economical ASF level is preferably in a range of from about "low" to about "medium" as defined in Section B of the Glossary hereinbelow. However, the effectiveness of the ASF in improving Bloom gel strength and viscosity as is not so limited as shown in the examples hereinbelow.

The ASF solution prepared in the manner described hereinabove is a substantially clear, colorless solution. Water-soluble protein cross-linked with the ASF solution produces a protein composition that is also substantially clear and colorless. The cross-linked protein composition may be gelled and dried by conventional procedures that are well-known in the art, as described in Section D of the Glossary, and may be in the form of a powder, solution or gel.

The water-soluble protein to be cross-linked is preferably treated in the form of an aqueous solution. The gelatin solution is preferably maintained at a temperature of above about 35 degree C. (about 95 degrees F.), since it is well-known that gelatins tend to gel below this temperature. More preferably, the water-soluble protein solution is warmed to between about 45 to about 50° C. (about 113° to 122° F.) prior to the addition of the ASF solution.

Viscosity and Bloom gel strength are well recognized measures of the grade and quality of a gelatin or glue. The two tests are usually determined on the same sample and the procedure is generally described in Section D of the Glossary hereinbelow. Since the amount of moisture in treated and control dried gelatins is quite variable, Bloom gel strength values are corrected to a standard moisture as described in Section D of the Glossary for a more accurate comparison between treated and untreated control dried samples.

In gelatin, cross-links are believed to involve multiple interactions between chains that form fibrils which reduce swelling. Gelatin usually exhibits its least degree of swelling within the range of its isoelectric point. It has been found that Type A gelatins treated with ASF as disclosed herein, produced cross-linked protein compositions that were clear and substantially color-free with improved Bloom gel strength and increased viscosity that was retained over a broad pH range of from about 4 to about 7.5. On the other hand, a similar treatment with alum showed it to be substantially ineffective as described in Example 5.

A polyvalent metal salt of a strong acid containing an iron (III) cation and an alkali metal double sulfate salt having a chromium (II) cation were not suitable in the same manner as the ASF. The iron salt was generally as ineffective as alum and also produced an undesirable colored precipitate when the pH value of the solution was adjusted to about 6.0. Although a chromium-double salt produced some increase in Bloom gel strength and some increase in viscosity approaching a level obtained with an aluminum double salt, it too produced an undesirable color in the composition and a precipitate at a pH value of about 6.0.

It was also found that regardless of the initial pH value of the untreated gelatin, the ASF solution produced a final pH value in a range of about 3.9 to about 5.0 when it was reacted with the gelatin. A maximum improvement in Bloom gel strength values of Type A gelatin were generally obtained when the pH value of the untreated gelatin was preferably adjusted to a range of from about 6.0 to about 7.0 prior to reacting it with ASF solution to provide a final pH value of about 4.7 to about 5.0 in the cross-linked gelatin composition. A maximum increase in viscosity for Type A gelatin was obtained when the untreated gelatin was adjusted to a pH value of about 3.5 to about 4.0 prior to reacting it with the ASF solution to provide a cross-linked gelatin composition having a final pH value of about 4.0 to about 4.2.

For Type B gelatin, a maximum improvement in Bloom value occurred when the untreated gelatin had an initial pH value in the range of between about 4.7 to about 5.5 prior to reacting it with ASF solution. The cross-linked gelatin composition had a final pH value within a range of between about 4.6 to about 5.5. Under similar conditions, viscosity also increased. However, it was found that a maximum increase in viscosity may occur when the initial pH value of the untreated gelatin is about 7.5.

This invention may be further understood by the following examples which are not intended to be limiting.

BEST MODES FOR CARRYING OUT THE INVENTION

Glossary of Materials and Methods

A. Preparation of ASF Solution

An aluminum subacetate solution was prepared by reacting a U.S.P. grade aluminum sulfate octadecahydrate (alum) with U.S.P. grade calcium carbonate in water to form hydroxy-aluminum carbonate. The resulting carbonate was treated with acetic acid and the aluminum subacetate was recovered as a clear filtrate (ASF) having a pH value of from about 4.0 to about 4.2 and contained from about 0.05 to about 16 weight percent aluminum subacetate, referred to herein as ASF solids. The major byproduct was calcium sulfate, which was removed from the ASF solution during the filtration process. An aluminum subacetate solution so prepared is referred to hereinafter as ASF solution.

An example of a formula and a method of preparation for ASF solution follows:

| Ingredient | Weight Percent |
|---|---|
| 1. Alum, U.S.P. (51.4%) | 16 |
| 2. Tap water (ambient room temperature) | 61 |
| 3. Calcium Carbonate U.S.P. | 7 |
| 4. Acetic acid (37%) | 16 |

(a) The alum solution (ingredient #1) was dispersed in the water (ingredient #2) with mixing agitation.

(b) Ingredient #3 was dissolved in the alum dispersion of step (a) by adding it very slowly and in small portions maintaining continuous mixing agitation. A large volume of carbon dioxide was produced and allowed to escape into the atmosphere.

(c) Ingredient #4 was added to the reaction mixture of step (b), and mixing agitation was continuously maintained until the addition of acid was completed.

(d) Mixing agitation was stopped, the reaction vessel was covered and the reaction mixture was allowed to age over a period of from about 20 to about 24 hours.

(e) The aluminum subacetate was recovered as ASF by filtering the reaction mixture through a filter paper, such as Whatman filter paper No. 40, using a Büchner funnel. Small quantities of tap water were used to rinse the reaction vessel and the filter cake to provide a final filtrate volume containing of from about 70 to about 80 weight percent of starting weight of materials, and having an average ASF solids content of from about 12 to about 16 weight percent.

An ASF solution so prepared could be stored for several days at most at ambient room temperature without becoming cloudy. For a longer-term storage, however, the ASF solution was preferably stored at a temperature of from about 3 to about 5 degrees C. (about 38 to about 40 degrees F.).

The reaction of ASF solution with collagen-derived protein was found to be quantitative and rapid and could result in reaction products that were too viscous to handle comfortably. Also such reaction products tended to gel rapidly. For purposes of illustrating the invention, therefore, the gelatin and glue solutions in the Examples hereinbelow contain 10 weight percent gelatin solids, and the ASF solution was diluted with tap water to various ASF levels as defined in Glossary Section B below.

B. ASF Levels

In the Examples hereinbelow reference will be made to various ASF levels used to cross-link gelatin or glue and are designated as defined below. These ASF levels were established for comparison purposes to correspond to pounds of 7.35 weight percent ASF solution per 10 lbs. gelatin to provide the calculated amount of ASF solids and aluminum (III) cation shown.

| ASF Level | 7.35% ASF Solution* | ASF Solids* | Al (III)** |
|---|---|---|---|
| Maximum | 13.16 | 0.96 | 0.16 |
| High | 10.7 | 0.78 | 0.13 |
| Medium-High | 7.4 | 0.54 | 0.09 |
| Medium | 6.0 | 0.44 | 0.07 |
| Medium-Low | 5.2 | 0.38 | 0.06 |
| Low | 2.96 | 0.22 | 0.036 |
| Minimum-Low | 1.66 | 0.12 | 0.02 |
| Minimum | 0.98 | 0.07 | 0.01 |

*Calculated in pounds per 10 pounds gelatin.
**Al (III) in aluminum subacetate = 16.65 weight percent, calculated in pounds per 10 pounds gelatin.

C. Procedure For Treating Gelatin

In the examples hereinbelow, the ASF solution was freshly prepared following the procedure in Glossary Section A and was provided at ambient room temperature of between about 20 to 30 degrees C. The gelatin solution was warmed to a temperature of between about 45 to 50 degrees C. (about 113 to 122 degrees F.) prior to dispersing ASF solution therein. Vigorous mixing agitation is utilized to avoid a localized reaction. During the mixing step, the temperature of the reaction mixture was maintained at above 35 degrees C. (about 65 degrees F.) until the reaction was complete.

D. Procedure for Pan-Gelling and Fan Drying Treated Gelatin

A treated gelatin solution, prepared as described in the preceding Glossary Section C, was poured into a shallow rectangular pan of either aluminum or of stainless steel to a depth of about one-half inch in a pan having a dimensional size of about 12×24 inches. The treated gelatin composition was allowed to gel or "set" in the pan at ambient room temperature for a period of from about 5 minutes to about 10 minutes.

The resulting gelled product was then removed from the pan and cut into strips of substantially equal size. Each strip was placed on a metal mesh screen having mesh openings of about one-half inch each. The product was allowed to air dry on the screen by circulating ambient room air with a conventional electric rotating-blade fan (hereinafter described as fan dried). The product was fan dried under ambient room temperature and ambient room humidity conditions for a period of between from about 18 to about 21 hours. The fan-dried product was ground to a powder in a conventional rotating blade blender, the technique and equipment of which are well known in the art.

It is to be understood that for comparative evaluations, an untreated gelatin control, was pan-gelled and fan-dried in the same foregoing manner.

E. Procedure for Determining the Moisture Content of Treated Gelatin

The moisture content of fan-dried treated or untreated gelatin was determined analytically using a well-known method available from the Association of Official Analytical Chemists (AOAC).

Briefly described, the method comprises the steps of accurately weighing 2 to 5 grams of fan-dried gelatin product, prepared as described in the preceding Glossary Section D, into a tared weighing dish. The product is heated in the dish in a convection hot air oven at a temperature of 100 degrees C. (212 degrees F.) for a period of 4 hours. The heated sample is removed from the oven and placed in a dessicator to cool to room temperature. Immediately on its reaching ambient room temperature, the sample is reweighed and the moisture content is calculated as a percent from the weight change.

F. Procedure for Determining Bloom Gel Strength and Corrected Bloom Value

Gel strength was measured in terms of a numerical Bloom value on the well-known Bloom Gelometer. The technique utilizes internationally recognized concentrations of 6.666 weight percent gelatin and 12.5 to 14.5 weight percent glue.

A solution of a treated, pan-gelled and fan-dried gelatin was prepared to give a 6.666 weight percent solids and was then matured for a period of from about 18 hours to about 20 hours at about 10 degrees C. (50 degrees F.) in a standard bottle. Bloom gel strength was measured at a gel temperature of about 10 degrees C. using the Bloom Gelometer by procedures well-known in the art.

The Bloom value initially measured was corrected for a "standard moisture" content taken as 11.5 percent based on an adjustment value of 5 times the difference between the actual percent moisture (determined as described in Glossary Section E hereinabove) in the gelatin and 11.5. For example: for a gelatin having an initially measured Bloom value of 248 and an actual moisture content of 14 percent the corrected Bloom value was 260 ($14-11.5=2.5\times5=12.5+248=260$). For a gelatin having the foregoing measured Bloom value and an actual moisture content of 5.5 percent, the corrected Bloom value was 218 ($5.5-11.5=-6\times5=-30+248=218$).

This adjustment in Bloom value allowed a more accurate comparison between control gelatin products, treated gelatins dried under the laboratory conditions hereinbefore described and treated gelatins dried under actual plant conditions. In the Examples which follow hereinbelow, the Bloom values have been so corrected and will be referred to hereinafter as "corrected" Bloom to distinguish them from the initially measured numerical value.

G. Procedure for Measuring the Viscosity of Treated Gelatins

The viscosity of a treated gelatin solution, prepared for Bloom gel strength measurements as described in the preceding Glossary Section F was measured using a well known AOAC method. Briefly described, the method comprises passing a gelatin solution at a temperature of 60 degrees C. (140 degrees F.) through a standard pipette and calculating the viscosity of the solution in millipoises (mp) from the seconds of flow.

EXAMPLE 1

Type A Gelatin Treated With Various Aluminum Salts

This comparative example shows the effect of various aluminum salts on the Bloom gel strength and viscosity of a Type A gelatin solution prepared from a sulfuric acid-hydrolyzed gelatin powder (referred to as dry gelatin).

The concentration of salt present in each of the treating solution was selected to provide about 0.07 grams of total metal cation per 10 grams dry basis of gelatin. For the ASF solution, this corresponded to a medium ASF level as defined above in Glossary Section B hereinabove. The gelatin was treated with each of the aluminum salts shown in the Table below following the treating procedure described in Glossary Section C hereinabove.

After the aluminum salt solution was reacted with the gelatin solution, the reaction product was then gelled and dried following the procedure in Glossary Section D hereinabove. Moisture content, Bloom gel strength and viscosity were measured, respectively, following the procedures in Glossary Sections E, F and G, hereinabove. The final pH value of the treated composition was also measured. The results follow.

| Sample No. | Salt | Grams Al (III) per 10 grams Gelatin | Final pH |
|---|---|---|---|
| 1 | ASF (medium level) | 0.072 | 4.7 |
| 2 | Alum | 0.072 | 3.9 |
| 3 | Aluminum chloride | 0.072 | 4.1* |
| 4 | Aluminum citrate | 0.075 | 4.2 |
| 5 | Aluminum lactate | 0.073 | 4.5 |
| 6 | Aluminum tartrate | 0.075 | 4.4 |
| 7 | Aluminum potassium acetate | 0.04 | 4.8 |
| 8 | Control | 0 | 4.3 |

| | | BLOOM Value | | | | |
|---|---|---|---|---|---|---|
| Sample No. | Percent Moisture | Initially Measured | Corrected | Percent Increase | Viscosity (mp) | Percent Increase |
| 1 | 15.6 | 215 | 236 | 59 | 37.0 | 48.0 |
| 2 | 17.6 | 150 | 181 | 22 | 25.1 | 0.4 |
| 3 | 16.9 | 165 | 192 | 29 | 28.2 | 12.8 |
| 4 | 16.2 | 121 | 145 | — | 18.7 | — |
| 5 | 16.9 | 129 | 156 | 5 | 22.3 | — |
| 6 | 16.4 | 130 | 155 | 5 | 19.8 | — |
| 7 | 9.8 | 210 | 201 | 38 | 33.8 | 35.2 |
| 8 | 10.0 | 156 | 148 | — | 25.0 | — |

*hazy

The data show that an unexpectedly high increase in both Bloom gel strength and in viscosity was achieved with the ASF solution (Sample #1) and with the aluminum potassium acetate double salt (Sample #7). Both are aluminum salts of acetic acid, which is a weak organic acid. The aluminum salts of other organic acids (samples #4, #5 and #6), however, were unreactive with the gelatin and tended to be insoluble.

Aluminum salts of a strong acid (samples #2 and #3) were generally less effective than ASF or the aluminum double salt. In further evaluations, the aluminum salts of strong acid either did not remain clear or precipitated if the reaction product was adjusted to a pH value of about 6.0 before the gelling and drying step. For example, when a second sample #2 was prepared and adjusted to a pH value of 6.0 with an aqueous 50% sodium hydroxide solution a precipitate formed, whereas a second sample #1, similarly adjusted, remained clear.

EXAMPLE 2

Type A Gelatin Treated With Aluminum And Alkali Metal Acetate Salts

The procedure of Example 1 was followed, except that the comparative effects of an acetate salt having an alkali metal cation, sodium, and two acetate salts each having an aluminum cation ASF and aluminum triacetate, were evaluated at a concentration of 0.16 grams of total metal cation per 10 grams of gelatin. For the ASF solution, this corresponds to a maximum ASF level as defined in Glossary Section B hereinabove. The results follow:

| Sample No. | Salt | pH |
|---|---|---|
| 1 | ASF (Maximum level) | 4.6 |
| 2 | Aluminum triacetate | 4.6 |
| 3 | Sodium acetate | 5.0 |
| 4 | Control | 4.9 |

| | | BLOOM Value | | | | |
|---|---|---|---|---|---|---|
| Sample No. | Percent Moisture | Initially Measured | Corrected | Percent Increase | Viscosity (mp) | Percent Increase |
| 1 | 9.6 | 334 | 324 | 128 | 65.3 | 229 |
| 2 | 8.9 | 310 | 297 | 109 | 48.6 | 145 |
| 3 | 9.0 | 145 | 132 | — | 16.0 | — |
| 4 | 8.9 | 155 | 142 | — | 19.8 | — |

The data show that the alkali metal cation, sodium, was ineffective in improving either the Bloom gel strength or in increasing the viscosity of the gelatin. On the other hand, both of the aluminum salts produced an unexpectedly high increase in both the Bloom gel strength and in viscosity. The data also show that the aluminum subacetate (ASF) was more effective than the aluminum triacetate.

EXAMPLE 3

Type A Gelatin Treated With Iron And Chromium Salts

The procedure of Example 1 was followed, except that the gelatin was treated with a polyvalent heavy metal salt of a strong acid, having other than an aluminum cation. A sulfate: salt having an Iron (III) cation and an alkali metal sulfate double salt having a chromium (II) cation were evaluated at a concentration of 0.06 grams polyvalent metal cation per 10 grams dry basis of gelatin. The results follow.

| Sample No. | Salt | pH |
|---|---|---|
| 1 | Potassium Chromium Sulfate | 3.9* |
| 2 | Iron (II) sulfate | 3.9** |
| 3 | None (Control) | 4.7 |

| | | BLOOM Value | | | | |
|---|---|---|---|---|---|---|
| Sample No. | Percent Moisture | Initially Measured | Corrected | Percent Increase | Viscosity (mp) | Percent Increase |
| 1 | 12.5 | 172 | 177 | 29 | 29.0 | 38 |
| 2 | 12.8 | 162 | 168 | 21 | 22.0 | 4.7 |
| 3 | 10.0 | 145 | 137 | — | 21.0 | — |

*green color
**brown color

The data show that the chromium-double salt produced some improvement in Bloom gel strength and some increase in viscosity approaching a level obtained with an aluminum double salt in Example 1. However, unlike the colorless aluminum double salt the chromium double salt imparted an undesirable green coloration to the protein composition. Further, when a second sample #1 was prepared and was adjusted to a pH value of 6 with aqueous 50% sodium hydroxide, an undesirable precipitate formed.

The Iron (II) sulfate improved Bloom gel strength to about the same degree as did the alum in Example 1 but was generally ineffective in increasing viscosity. It also produced an undesirable coloration in the composition. Also, a second sample #2 formed an undesirable precipitate, when it was adjusted to a pH value of 6 with sodium hydroxide as described above.

EXAMPLE 4

Effect Of pH Value On Aluminum-Treated Type A Gelatin

This comparative example shows the effect on Bloom gel strength, viscosity and clarity of Type A gelatin treated separately with ASF solution and with alum solution over a range in pH value of from about 3 to about 9.

The treating procedure of Glossary Section C hereinabove was followed. The concentration of aluminum ion selected was 0.06 grams per 10 grams dry basis gelatin. This concentration of aluminum ion corresponds to a medium low ASF level as defined in Glossary Section B hereinabove.

After the gelatin was treated with the aluminum salt of choice, the reaction solution was split into five portions. Each portion of the reaction solution was separately adjusted to the pH value shown below using either aqueous 37% hydrochloric acid or aqueous 50% sodium hydroxide solution, as needed. Each pH adjusted reaction product was then pan-gelled and fan dried and its Bloom gel strength and viscosity measured respectively following the procedures of Glossary Sections D, F and G hereinabove.

Additionally, the clarity of each reaction product was evaluated by measuring the percent light transmission of the gelatin solution prepared for Bloom gel strength evaluation as described in the Glossary Section F hereinabove. The transmittancy of light through a 2 centimeter glass cell at a wavelength of 640 nanometers was measured using a commercially available spectrophotometer (Coleman Model 6/35, Coleman Instrument Division of Perkin-Elmer Corporation, N.J.). All data are shown below.

| Gelatin Treatment | pH | Corrected Bloom Value | Viscosity (mp) | Percent Transmission |
|---|---|---|---|---|
| ASF | 3 | 96 | 22 | 94 |
| | 4 | 178 | 36 | 94 |
| | 5 | 240 | 29 | 93 |
| | 7 | 174 | 24 | 90 |
| | 9 | 110 | 21 | 49 (turbid) |
| Alum | 3 | 62 | 13 | 83 |
| | 4 | 120 | 17 | 28 |
| | 5 | 122 | 20 | 16 |
| | 7 | 113 | — | (ppt) |
| | 9 | 65 | — | (ppt) |
| Control | 3 | 96 | 22 | 96 |
| Untreated | 4 | 117 | 21 | 95 |
| | 5 | 150 | 19 | 94 |
| | 7 | 156 | 18 | 92 |
| | 9 | 150 | 18 | 91 |

The data show that a medium-low ASF level improved Bloom gel strength and increased viscosity, and retained said improvements within a range of pH values of from about 4 to about 7 along with a clarity equivalent to that of the untreated gelatin. At a pH value of 3, the gelatin treated with ASF was the same as untreated gelatin. At a pH value above between about 7 and about 9, the ASF treatment became less effective. This was believed to be due to hydrolysis of the ASF to an insoluble aluminum hydroxide, evidenced as a turbidity at about pH 9.0.

The data further show that alum was generally ineffective in increasing Bloom gel strength or viscosity. It also developed insoluble aluminum hydroxide, evidenced as a decreased transmission value within an acid pH range of from about 3 to about 5, and as a precipitate at a pH value above pH 5.0.

In the absence of gelatin, an ASF solution retained a transmission value of 100% when the solution was titrated with aqueous 50% sodium hydroxide solution to between a pH value of between about 3 to about 5. Transmission decreased sharply to a value between about 30 to 35% at a pH value of about 5, and decreased to a value of between about 25 and 28% transmission at a pH value of about 6.0 and above.

On the other hand, when a solution of alum without gelatin present was similarly titrated, it decreased in transmission value from between about 90 and 95% at a pH value of 3 to a transmission of 0% at a pH value of about between 4 and 5. This showed that gelatin could be cross-linked with ASF solution over a broader pH range than with alum before any hydrolysis inactivation from hydrolysis occurred.

EXAMPLE 5

Type A Gelatin Treated With Various ASF Levels

This comparative example illustrates the effect of various ASF levels as defined in Glossary Section B hereinabove. ASF solutions were prepared to provide the ASF level described in the Table below. The procedure of Example 1 was followed, except that several type A gelatins were evaluated, obtained from various lots of (A-G) of either as a "dry" gelatin powder, referred to herein as dry gelatin, or as a "third run" gelatin liquor. A "third run" gelatin liquor refers to a gelatin extracted from the third "cooking" step of the acid hydrolysis of collagen and usually has low Bloom gel stength and low viscosity values. The third run gelatin liquors used were sulfuric acid-extracted gelatin from plant runs. These liquors were typically obtained as a 33.7 weight percent liquor and were diluted, as necessary, to provide a 10 weight percent gelatin solution.

Color was ranked by visually comparing the color of a treated gelatin solution against that of a series of standard solutions assigned numerical values on a scale of from 130 to 170. A value of 130 is considered to be poor and highly colored (deep amber), whereas a value of 170 is considered to be excellent and substantially color-free (faint yellow). Cloud was ranked on a scale of 40 to 150, based on its transmittance value. A cloud value of 40 corresponds to a percent transmittance of about 72% or less, and a cloud value of 150 corresponds to about 98%. A cloud value of 150 rated excellent, a value between 100 and 149 rated good, a value between 99 and 90 rated fair and a value between 90 and 40 rated poor.

The moisture content of the untreated gelatin product determined as described in Glossary Section C hereinabove, was in the range of from 9.4 to 12.9 percent for the untreated gelatin controls and from 12.7 to 16.0 percent for the ASF-treated gelatins. Other data is shown in the following Table.

| Treated Sample | ASF Level | Corrected Bloom Value | Viscosity (mp) | pH | Color | Cloud | Percent Transmission |
|---|---|---|---|---|---|---|---|
| | | Lot A. Dry Gelatin | | | | | |
| 1 | High | 316 | 52 | 4.6 | 170 | 120 | 92 |
| 2 | Med. | 270 | 31 | 4.8 | 170 | 130 | 93 |
| 3 | Low | 234 | 24 | 4.9 | 170 | 130 | 89 |
| 4 | Control | 149 | 19 | 4.9 | 170 | 130 | 93.3 |
| | | Lot B. Dry Gelatin | | | | | |
| 5 | Med. | 320 | 350 (est.) | 4.7 | 170 | 120 | 90.2 |
| 6 | Low | 306 | 92 | 4.8 | 170 | 120 | 90.0 |
| 7 | Min. | 274 | 57 | 4.8 | 170 | 100 | 85.0 |
| 8 | Control | 256 | 43 | 4.8 | 170 | 130 | 94.3 |
| | | Lot C. Dry Gelatin | | | | | |
| 9 | High | 232 | 62 | 4.6 | 165 | 70 | 77.3 |
| 10 | Med. | 200 | 34 | 4.6 | 165 | 60 | 76.6 |
| 11 | Control | 119 | 21 | 4.2 | 165 | 70 | 78.3 |
| | | Lot D. Dry Gelatin | | | | | |
| 12 | Med. | 212 | 43 | 4.5 | — | 40 | 43.2 |
| 13 | Control | 107 | 20 | 4.4 | — | 40 | 43.3 |
| | | Lot E. Dry Glue | | | | | |
| 14 | Med. High | 140 | 250 (est) | 5.2 | 130 | 40 | 3.2 |
| 15 | Control | 78 | 24 | 6.3 | 130 | 40 | 3.3 |
| | | Lot F. Third Run Gelatin Liquor | | | | | |
| 16 | Med. High | 202 | 76 | 4.4 | 155 | 60 | 75 |
| 17 | Control | 156 | 30 | 4.5 | 160 | 60 | 75 |
| | | Lot G. Third Run Gelatin Liquor | | | | | |
| 18 | Med. High | 196 | 39 | 4.4 | 160 | 110 | 88 |
| 19 | Control | 110 | 22 | 4.2 | 160 | 110 | 88.5 |

The data show that the gelatin Bloom gel strength improved and viscosity increased as the ASF level of the treating solution increased. Cloud, color and percent transmission values of untreated gelatin were substantially retained when treated with ASF levels ranging from minimum to high. From a cost viewpoint, a medium ASF level was preferred.

EXAMPLE 6

Buffering Effect Of Gelatin During Treatment With ASF Solution

The procedure of Example 1 was followed, except that the type A gelatin solution prepared was divided into portions of 300 grams each. Each portion was separately adjusted with aqueous hydrochloric acid or sodium hydroxide, as needed, to a pH value of between about 2.5 to 8.5 prior to adding ASF solution. The ASF solution provided a medium ASF level of 0.06 grams aluminum ion per 10 grams dry basis gelatin. The results follow for four runs of gelatins obtained from different lots (A, B, C, D).

| No. | Initial pH | Final pH | Corrected Bloom Value | Percent Increase | Viscosity (mp) | Percent Increase |
|---|---|---|---|---|---|---|
| | | | Run #1, Lot A Untreated Sample Control | | | |
| | 5.2 | 5.2 | 152 | — | 19.0 | — |
| | | | ASF Treated Sample | | | |
| 1 | 2.5 | 3.9 | 169 | 11.2 | 26.1 | 37.4 |
| 2 | 3.5 | 4.0 | 196 | 28.9 | 27.5 | 44.7 |
| 3 | 5.2 | 4.6 | 248 | 63.2 | 27.2 | 43.2 |
| 4 | 6.5 | 4.8 | 252 | 65.6 | 25.4 | 33.7 |
| 5 | 8.5 | 5.0 | 250 | 64.5 | 24.8 | 30.5 |
| | | | Run #2, Lot B Untreated Control | | | |
| | 4.6 | 4.6 | 100 | | 20.0 | |
| | | | ASF Treated Sample | | | |
| 6 | 3.5 | 4.1 | 143 | 43.0 | 25.1 | 25.5 |
| 7 | 7.0 | 5.0 | 177 | 77.0 | 21.2 | 11.6 |
| | | | Run #3, Lot C Untreated Control | | | |
| | 4.3 | 4.3 | 100 | | 20.0 | |
| | | | ASF Treated Sample | | | |
| 8 | 6.0 | 4.8 | 178 | 78.0 | 23.4 | 17.0 |
| 9 | 4.0 | 4.2 | 156 | 56.0 | 25.8 | 29.0 |
| | | | Run #4, Lot D Untreated Control | | | |
| | 4.5 | 4.5 | 97 | | 21.0 | |
| | | | Treated Sample | | | |
| 10 | 6.0 | 4.7 | 202 | 208 | 30.8 | 46.7 |
| 11 | 4.0 | 4.1 | 161 | 66 | 32.8 | 56.2 |

The final pH data for the treated gelatins demonstrated the buffering capacity of the gelatin in the presence of ASF. All final pH values fell in a range of between about 3.9 and about 5.0 regardless of the initial pH value of the untreated gelatin prior to the addition of ASF solution. The initial pH value of all untreated control gelatins was unchanged during gelling and drying.

The data from each run also show that maximum Bloom values were obtained when the pH value of the untreated gelatin was adjusted to a range of between about 6.0 and about 7.0 before the addition of ASF solution, to provide a final pH value of about 4.7 to 5.0 (samples #4, #7, #8 and #10). These data further show that maximum viscosity was obtained when the untreated gelatin was adjusted to a pH value of about 3.5 to about 4.0 prior to adding the ASF solution to provide a final pH value of about 4.0 to about 4.2 (samples #2, #6, #9 and #11).

EXAMPLE 7

Various Acid-Hydrolyzed Type A Gelatin Reacted With ASF Solution

The procedure of Example 1 was followed, except that the type A gelatin used was selected from hydrochloric acid-hydrolyzed and from sulfuric acid-hydrolyzed third run plant liquors. Also in preparing the gelatin solution, the gelatin liquor and the tap water were warmed to a temperature of about 45 degrees C. (113 degrees F.), and the pH value of the diluted gelatin was adjusted to about 6.0 with aqueous 50% sodium hydroxide prior to adding ASF solution. The sulfuric acid-hydrolyzed gelatin liquors had a solids content ranging from about 33.7 to about 38.1 weight percent, and the hydrochloric acid hydrolyzed gelatin liquors had a solids content ranging from about 34.6 to about 43.0 weight percent when obtained from the plant run.

The comparative data shown below was obtained from five lots of sulfuric acid-hydrolyzed gelatin (samples #1-5) and from four lots of hydrochloric acid-hydrolyzed gelatin (samples #6-9), each separately treated with a medium-low ASF level (samples

1A-5A and samples 6A-9A, respectively). The hydrochloric acid-hydrolyzed gelatin lots were also treated with a minimum-low level of ASF (samples #6B-9B). Color values and cloud values were determined following the procedure of Example 5.

| Control Sample No. | Initial pH Data | | | | |
|---|---|---|---|---|---|
| | Untreated Control | Treated Sample No. | ASF Level Medium-Low | Treated Sample No. | ASF Level Minimum-Low |
| | Sulfuric Acid-Hydrolyzed Lot* | | | | |
| 1 | 4.25 | 1A | 4.7 | — | — |
| 2 | 4.30 | 2A | 4.7 | — | — |
| 3 | 4.20 | 3A | 4.7 | — | — |
| 4 | 4.36 | 4A | 4.7 | — | — |
| 5 | 4.40 | 5A | 4.7 | — | — |
| | Hydrochloric Acid-Hydrolyzed Lot* | | | | |
| 6 | 4.5 | 6A | 4.7 | 6B | 5.1 |
| 7 | 4.35 | 7A | 4.7 | 7B | 5.1 |
| 8 | 4.35 | 8A | 4.7 | 8B | 5.1 |
| 9 | 4.30 | 9A | 4.7 | 9B | 5.1 |

*Sulfate content was analyzed by the well known gravimetric determination technique using barium chloride. Lot 1 = 3.54%; lot 2 = 2.51%; lot 3 = 3.4%, lot 4 = 3.20%; and lot 5 = 3.26%; Lot 6 = 0.17%; lot 7 = 0.66%; lot 8 = 1.23% and lot 9 = 0.95% sulfate.

| Sample No. | Final Composition | | | | | |
|---|---|---|---|---|---|---|
| | Corrected Bloom | Viscosity (mp) | pH | Color | Cloud | Percent Moisture |
| 1 | 136 | 15.6 | 4.2 | 100 | 160 | 7.5 |
| 1A | 200 | 24.1 | 4.7 | — | — | 15.5 |
| 2 | 117 | 19.8 | 4.0 | 160 | 140 | 11.3 |
| 2A | 197 | 23.0 | 4.8 | — | — | 14.9 |
| 3 | 83 | 17.6 | 4.0 | 160 | 140 | 8.0 |
| 3A | 185 | 19.8 | 4.8 | — | — | 16.9 |
| 4 | 118 | 21.9 | 4.3 | 165 | 140 | 9.1 |
| 4A | 219 | 31.2 | 4.8 | — | — | 17.0 |
| 5 | 128 | 22.6 | 4.2 | 165 | 140 | 10.0 |
| 5A | 200 | 26.5 | 4.8 | — | — | 16.6 |
| 6 | 148 | 27.2 | 4.3 | 160 | 120 | 9.8 |
| 6A | 243 | 40.4 | 4.9 | — | — | 16.6 |
| 6B | 184 | 24.1 | 5.2 | — | — | 16.0 |
| 7 | 156 | 31.5 | 4.1 | 165 | 120 | 8.7 |
| 7A | 267 | 68.1 | 4.8 | — | — | 16.9 |
| 7B | 223 | 33.1 | 5.1 | — | — | 17.3 |
| 8 | 141 | 29.5 | 4.0 | 165 | 40 | 8.4 |
| 8A | 243 | 45.3 | 4.9 | — | — | 16.9 |
| 8B | 207 | 29.0 | 5.1 | — | — | 17.3 |
| 9 | 99 | 21.9 | 4.0 | 160 | 90 | 11.8 |
| 9A | 192 | 27.2 | 4.9 | — | — | 16.01 |
| 9B | 154 | 20.9 | 5.1 | — | — | 16.7 |

The data show that the Bloom value of the pH 6-adjusted gelatin liquor improved when the gelatin was treated with the medium-low ASF level by an average of from about 75 to 96%, respectively, for hydrochloric acid-hydrolyzed gelatin (samples #6A, #7A, #8A and #9A) and sulfuric acid-hydrolyzed gelatin (samples #1A, #2A, #3A and #4A). When the minimum-low ASF level was used, the hydrochloric acid-hydrolyzed gelatin (samples #6B, #7B, #8B and #9B) improved in Bloom value an average of about 52%.

On the other hand, the average increase in viscosity obtained with the medium-low ASF level was higher for hydrochloric acid-hydrolyzed gelatin (samples #6A, #7A, #8A and #9A=average of about 60% increase) than for sulfuric acid-hydrolyzed gelatin (samples #1A, #2A, #3A and #4A=average of about 28% increase). The minimum-low ASF level did not increase the viscosity of hydrochloric acid-hydrolyzed gelatin and generally tended to decrease viscosity an average of about 3%. These data suggest, therefore, that a medium-low ASF level should be used where increases in both Bloom value and viscosity are desired. It is also believed that salt formation in hydrochloric acid-hydrolyzed gelatin during the pH adjustment step may have overcome any possible beneficial effect of a minimum-low ASF level on viscosity.

Color values and cloud values and moisture values were substantially similar for all the ASF-treated samples.

EXAMPLE 8

Alkali-Hydrolyzed Type B Gelatin Reacted With ASF Solution

The procedure of Example 1 was followed, except that the gelatin solution was prepared from Type B gelatin. A series of gelatin solutions were prepared from three different lots and each was separately adjusted to various pH values between about 4.0 and 7.5 as shown below with aqueous 37% hydrochloric acid or with aqueous 50% sodium hydroxide solution as needed, and were then reacted with a minimum-low ASF level of 0.036 grams aluminum ion per 10 grams dry basis gelatin. The results follow.

| Sample | Initial pH | Final Composition | | |
|---|---|---|---|---|
| | | Corrected Bloom Value | Viscosity (mp) | pH |
| Lot 1 | | | | |
| A Untreated control | 4.8 | 263 | 35.0 | 4.8 |
| B Treated | 4.8 | 379 | 61.5 | 4.6 |
| C Treated* | 6.0 | 318 | 44.1 | 5.3 |
| Lot 2 | | | | |
| D Untreated control | 5.3 | 122 | 36.0 | 5.3 |
| E Treated** | 4.0 | 133 | 34.1 | 4.0 |
| F Treated | 5.3 | 176 | 50.3 | 5.1 |
| G Treated* | 6.5 | 164 | 46.2 | 5.4 |
| H Treated* | 7.5 | 162 | 50.8 | 5.5 |
| Lot 3 | | | | |
| I Untreated control | 4.9 | 96 | 17.0 | 4.9 |
| J Treated | 4.9 | 174 | 20.9 | 4.7 |
| K Treated* | 6.5 | 162 | 20.1 | 5.4 |
| L Treated* | 7.5 | 166 | 24.1 | 5.5 |

*Adjusted to initial value pH with 50% NaOH, prior to adding ASF solution.
**Adjusted to initial pH value with 37% HCl, prior to adding ASF solution.

The data show that for treated Type B gelatin, a maximum improvement in Bloom value was obtained with gelatin having an initial pH value within a range of between about 4.8 to 5.3. Viscosity also increased within this pH range. However, the data from two of the lots (samples 2H and 3L) of gelatin suggested that maximum viscosity may occur at a pH value of about 7.5.

EXAMPLE 9

Enzyme-Hydrolyzed Gelatin Treated With ASF Solution

This example illustrates the ability of ASF solution to induce gelation of enzyme-hydrolyzed gelatin (hereinafter protein hydrolyzate). An aqueous solution of the protein hydrolyzate was prepared containing 30 weight percent of papain-hydrolyzed gelatin powder. The solution was reacted following the procedure of Glossary Section C hereinabove with an ASF solution providing 1.4 grams ASF solids (0.233 grams aluminum ion) per 10 grams (solids basis) protein hydrolyzate. The resulting reaction product was pan-gelled and fan dried following the procedures of Glossary Section D, hereinabove.

Separate aqueous solutions of the treated protein composition were then prepared containing 10, 20 and 30 weight percent of the treated protein hydrolyzate. Each solution was separately chilled in a refrigerator for a period of from about 18 to about 20 hours at a temperature of about 2 to about 4.5 degrees C. (about 34.5 to 40 degrees F.). A separate second series of solutions was also similarly prepared and treated using 2.8 grams ASF solids (0.466 grams aluminum ion) per 10 grams (solids basis) protein hydrolyzate. The appearance and Bloom gel strength of the chilled samples was evaluated. The results follow.

| ASF Grams Solids | Treated Protein Hydrolyzate Weight Percent | Appearance of Chilled Sample | Bloom Gel Strength* (gms) |
|---|---|---|---|
| 1.4 | 10 | fluid | — |
| 2.8 | 10 | fluid | — |
| 1.4 | 20 | gel | 5.0 |
| 2.8 | 20 | gel | 12.7 |
| 1.4 | 30 | gel | 74.0 |
| 2.8 | 30 | gel | 91.0 |
| None (Control) | 30 | fluid | — |

*80 ml in 100 ml beakers using Bloom Gelometer

The data showed that ASF treatment of protein hydrolyzate induced gelation at concentrations of 20 to 30 weight percent protein solids, and that Bloom gel strength increased as ASF solids were increased during treatment. This data suggested that ASF solution was able to increase the average molecular weight of the protein hydrolyzate by cross-linking small peptide fragments present in the enzyme-hydrolyzed gelatin.

EXAMPLE 9

Effect Of Ammonium Sulfate On ASF Treatment Of Type A Gelatin

This comparative example illustrates the tendency for inactivation of ASF reactivity by the presence of a salt capable of forming an inactive aluminum salt.

The procedure of Example 1 was followed except that ammonium sulfate was added to a solution of sulfuric acid-hydrolyzed Type A gelatin prior to reacting it with a medium-low ASF level. Ammonium sulfate was added at a concentration of 0.35 weight percent in a first sample (#2) and 0.8 weight percent in a second sample (#3). The results follow.

| | Percent Ammonium Sulfate | Final Composition: Corrected Bloom | Viscosity (mp) | pH | Percent Moisture | Percent Sulfate |
|---|---|---|---|---|---|---|
| | | ASF-Treated | | | | |
| Sample 1 | 0 | 258 | 30.2 | 4.6 | 14.0 | 1.91 |
| Sample 2 | 0.35 | 214 | 23.4 | 4.7 | 12.7 | 4.24 |
| Sample 3 | 0.80 | 177 | 20.0 | 4.7 | 13.3 | 7.58 |
| | | CONTROL. Untreated | | | | |
| Sample 4 | 0 | 144 | 18.0 | 4.8 | 13.3 | 1.91 |

The data for samples 2 and 3 showed that the ammonium sulfate salt decreased the effectiveness of ASF in improving Bloom value and in increasing viscosity. Inactivation of the aluminum salt was believed due to the formation of ineffective aluminum sulfate.

The present invention has been described with respect to preferred embodiments. It will be clear to those skilled in the art that modifications and or variations of the disclosed compositions and methods can be made without departing from the scope of the invention set forth herein. The invention is defined by the claims that follow.

What is claimed is:

1. A cross-linked collagen-derived protein composition having improved Bloom gel strength and increased viscosity, said protein composition being the reaction product of a water-soluble collagen-derived protein with an aluminum salt of acetic acid selected from the group consisting of aluminum subacetate, aluminum triacetate and an alkali metal aluminum acetate double salt.

2. The composition of claim 1 wherein the water-soluble protein is derived from animal collagen selected from the group consisting of a gelatin, an animal glue, and a protein hydrolyzate.

3. The composition of claim 2 wherein the water-soluble protein is selected from the group consisting of an acid-hydrolyzed collagen, an alkali-hydrolyzed collagen and a proteolytic enzyme-hydrolyzed collagen.

4. The composition of claim 1 wherein the aluminum salt is aluminum subacetate.

5. The composition of claim 1 wherein the aluminum salt is aluminum triacetate.

6. The composition of claim 1 wherein the aluminum salt is aluminum potassium acetate.

7. The composition of claim 1 wherein the aluminum salt is aluminum sodium acetate.

8. The composition of claim 1 wherein the water-soluble protein is a gelatin.

9. The composition of claim 1 wherein the water-soluble protein is a glue.

10. The composition of claim 1 wherein the water-soluble protein is a protein hydrolyzate.

11. The composition of claim 1 wherein the protein composition is in the form of a powder, solution or a gel.

12. The composition of claim 1 wherein the protein composition is in aqueous solution and is clear and substantially color-free.

13. In a method for cross-linking a water-soluble collagen-derived protein with a polyvalent metal ion, the improvement comprising the steps of reacting the protein in water with an aluminum salt of acetic acid selected from the group consisting of aluminum subacetate, aluminum triacetate and an alkali metal aluminum acetate double salt whereby the treated protein is a cross-linked protein composition of improved Bloom gel strength and increased viscosity.

14. The method of claim 13 wherein the protein is reacted with the aluminum salt at a ratio of from about 0.01 to about 0.20 parts by weight aluminum ion to 10 parts by weight protein.

15. A method for treating a water-soluble protein comprising the steps of:

(a) preparing a clear aluminum subacetate filtrate solution having a solids content of from about 0.05 to about 16 weight percent and a pH value in the range of from about 4.0 to about 4.2, said solution being prepared by reacting aluminum sulfate octadecahydrate with a quantitative amount of calcium carbonate in water to form a hydroxyaluminum carbonate and treating the resultant hydroxyaluminum carbonate with a quantitative amount of acetic acid to form an aluminum subacetate solution, ageing said solution for a period of from about 20 to about 24 hours, filtering said aged solution to recover said aluminum subacetate as a clear filtrate solution having sufficient water to adjust the solids content;

(b) providing a collagen-derived aqueous protein solution, said solution comprising 10 parts by weight water-soluble protein and 90 parts by weight water, said protein selected from the group consisting of an acid-hydrolyzed collagen, an alkaline-hydrolyzed collagen and proteolytic enzyme-hydrolyzed collagen; and (c) reacting the aluminum subacetate with the water-soluble protein by adding the filtrate solution to the protein solution with mixing agitation, whereby said reaction product is a cross-linked protein composition having an improved Bloom gel strength and increased viscosity.

16. The method of claim 15 wherein the protein solution is adjusted to a pH value in a range of from about 2.5 to about 9.5 with a sufficient amount of acid or base before the reacting step.

17. The method of claim 15 wherein the protein solution is adjusted to a pH value of about 5.5 to 6.5 with a sufficient amount of sodium hydroxide before the reacting step.

18. The method of claim 15 wherein the protein solution is heated to a temperature range of from about 45 to about 50 degrees C. (about 113 to 122 degrees F.) before the reacting step.

19. The method of claim 15 further including the step of chilling the reaction product to a temperature of from about 2 to about 4.5 degrees C. (about 34.5 to 40 degrees F.) for a period of from about 18 to about 20 hours.

* * * * *